United States Patent [19]

Glass et al.

[11] Patent Number: 4,834,986

[45] Date of Patent: May 30, 1989

[54] CONSISTENTLY SOFT-CHEW TEXTURED GUM COMPOSITION

[75] Inventors: Michael Glass, Fairlawn, N.J.; Kenneth P. Bilka, Floral Park, N.Y.; Anthony Guzowski, Maspeth, N.Y.; Eva Malinowski, Franklin Square, N.Y.

[73] Assignee: Warner-Lambert Company, Morris Plains, N.J.

[21] Appl. No.: 112,314

[22] Filed: Oct. 22, 1987

[51] Int. Cl.$^4$ ............................................. A23G 3/30
[52] U.S. Cl. ........................................ 426/3; 426/548; 426/804
[58] Field of Search ........................................ 426/3–6, 426/548, 804

[56] References Cited

U.S. PATENT DOCUMENTS

| | | | |
|---|---|---|---|
| 4,352,822 | 10/1982 | Cherukuri et al. | 426/3 |
| 4,352,823 | 10/1982 | Cherukuri et al. | 426/5 |
| 4,490,395 | 12/1984 | Cherukuri et al. | 426/6 |
| 4,500,547 | 2/1985 | Puglia et al. | 426/6 |
| 4,597,970 | 7/1986 | Sharma et al. | 426/5 |
| 4,656,039 | 4/1987 | Weiss | 426/5 |
| 4,675,190 | 6/1987 | Glass et al. | 426/5 |
| 4,721,620 | 1/1988 | Cherukuri et al. | 426/3 |

*Primary Examiner*—Jeanette Hunter
*Attorney, Agent, or Firm*—Daniel A. Scola, Jr.

[57] ABSTRACT

A gum composition is disclosed which has a substantially uniform soft chew from the initial chew, through the intermediate chew and on through the final chew. The gum composition can be a sugar or sugarless chewing gum composition or bubble gum composition. The gum compositions comprise a gum base, at least one sweetener, an acetylated monoglyceride, glycerin, and optionally, at least one gum additive of a type conventionally found in gum.

30 Claims, No Drawings

CONSISTENTLY SOFT-CHEW TEXTURED GUM COMPOSITION

FIELD

This invention relates to gum compositions, including chewing gums and bubble gums, which have a consistent chew texture and improved resistance to staling.

BACKGROUND

Chewing gums and bubble gums have been prepared in the past, with the purpose in mind of extending shelf life and providing improved chew texture. Characteristically, gums prepared and stored, even at room temperature for extended periods of time, tend to lose their moisture and elasticity, with the result that they become brittle, and initially crumble when they are placed in the mouth. This problem is particularly noticeable in the instance of sugarless gums, and particularly those gums that are stored in a dry atmosphere, i.e. an atmosphere having less than from 50 to 60% relative humidity.

Sugarless gums conventionally contain on the order of about 5% of water, and it is therefore theorized that brittleness or the phenomenon of staling results from the loss of that water, due to evaporation or otherwise, over time. Specifically, most sugarless gums contain large amounts of sorbitol, which serves conventionally as a sweetener, as well as a bulking aid. Sorbitol is known for its tendency to recrystallize in the presence of even small amounts of water, and its tendency to crystallize when the water in which it is dissolved is removed. It is therefore theorized that, as the water containing the sorbitol in the gum composition is lost by evaporation or otherwise, the sorbitol crystallizes and thus promotes the embrittlement of the gum composition, that contributes to the staling phenomenon. One workable approach to prolonging gum composition freshness relied on the use of fin-seal packaging with water vapor impermeable laminates to exclude all external ambient atmosphere and accompanying moisture and conversely to prevent the egress of moisture from the package contents. This approach is very costly and has its limitations, as periodic package leakage permits staling to occur unabetted as before.

Another approach has been to utilize anhydrous chewing gum compositions in conjunction with glycerin. For example, U.S. 4,514,422, issued to Yang et al on April 30, 1985, discloses a gum composition having improved shelf life and resistance to staling comprising a substantially anhydrous mixture of a gum base, at least one sugar alcohol, and glycerin. The glycerin is present in an amount from about 8% to about 18% by weight of the gum composition. The gum composition is further characterized by containing no more than 2% by weight of water in any form. The gum base may be present in an amount by weight ranging from about 15% to about 30% and the sugar alcohols may be present in an amount ranging from about 40% to about 75% by weight. The sugar alcohols utilized preferably comprise sorbitol, mannitol, xylitol and appropriate mixtures. Although Yang et al disclose that fatty acid monoglycerides may be used in their compositions, there is no disclosure or suggestion of the use of acetylated monoglycerides.

Pending U.S. application Ser. No. 846,690 filed April 1, 1986 of Cherukuri et al discloses a bubble gum base as well as a bubble gum composition which have excellent initial and extended chew properties, forms an essentially continuous film, maintains the bubble shape after the bubble has been formed and resists ingredient separation. These textural properties were produced from a unique combination of non-SBR elastomers, a combination of at least two different polyvinyl acetate polymeric materials and an acetylated monoglyceride which has a saponification value above about 400. The acetylated monoglycerides are used in amounts of about 5% to about 12% (by weight of the gum base composition). It is also disclosed that a variety of traditional ingredients, such as plasticizers or softeners, may optionally be added. Such materials are optional and not essential and amongst the exemplified materials there is included glycerine. Such materials are generally employed in amounts of about 6% to about 20% by weight of the gum base composition. It is disclosed that the gum base may be used in amounts of about 5% to about 45% of the final gum composition.

Cherukuri et al. U.S Pat. No. 4,352,822 on Oct. 5, 1982, reexamination certificate issued Sept. 3, 1985, discloses a non-styrene-butadiene rubber gum base comprising a polyisobutylene elastomer or a mixture of medium and lower molecular weight polyisobutylene elastomers together with a unique combination of plasticizers including glyceryl triacetate and acetylated monoglycerides together with a hydrophilic type detackifier, such as polyvinyl acetate and a combination of ingredients to impart non-stick properties. It is disclosed that the mixture of glyceryl triacetate and acetylated monoglyceride plasticizers are essential to the gum base for imparting softness and plasticization to the gum base. The glyceryl triacetate will be present in an amount of within the range of from about 0 to about 10%, and preferably from about 1 to about 8% by weight of the gum base, while the acetylated monoglyceride will be present in an amount of within the range of from about 0 to about 15%, and preferably from about 1 to about 10% by weight of the gum base. The gum base is employed with other chewing gum ingredients to form chewing gum compositions. The chewing gum compositions will include from about 10 to about 40% by weight of the gum base. Example 3 of the patent discloses a bubble gum using glycerine in the composition as a softener Cherukuri et al. U.S. 4,352,823 issued on Oct. 5, 1982 discloses a coextruded chewing gum which is formed of an extruded soft non-styrenebutadiene gum center or core portion, and an outer gum or shell portion having a harder consistency than the soft gum center or core portion, coextruded with and about the soft core portion. In a preferred embodiment the core portion will contain in excess of 1%, usually above 5 and up to 10% moisture, and preferably from about 6 to about 8% by weight moisture, that is, amounts of moisture not normally employed in all-solid chewing gums. The core portion is soft, sticky and difficult to handle but through coextrusion techniques, the outer shell layer acts as a support and protective coating for the soft and sticky inner core portion.

The soft gum core portion of U.S. Pat. No. 4,352,823, will preferably be formed of a sugar containing chewing gum, although soft sugarless chewing gums may be employed as well In a preferred embodiment, the sugar containing soft gum core portion will have a short nougat-like or fondant-like structure, a long-lasting sweetness, a soft and smooth consistency, an amorphous bite through and easy chew and a high moisture content (from over about 5 to about 10%, preferably from about 6 to about 8% moisture).

The chewing gum forming the outer shell portion in U.S. Pat. No. 4,352,823 may comprise chewing gum formulations generally known in the art. Each of the core and shell chewing gums may be of the sugar-containing or sugarless variety. Thus, in the sugar-containing coextruded chewing gum of the invention, both the core and outer shell portions may be sugar-containing or one may be sugar-containing and the other sugarless.

The soft core portion in U.S. Pat. No. 4,352,823 gum base includes a combination of plasticizers including acetylated mono and triglycerides, and glyceryl triacetate together with a hydrophilic type detackifier and a combination of ingredients to impart non-stick properties. It is disclosed that the mixture of glyceryl triacetate and acetylated monoglyceride plasticizers are essential to the non-styrene-butadiene gum base for imparting softness and plasticization thereto. The glyceryl triacetate will be present in an amount within the range of from about 0 to about 10%, and preferably from about 1 to about 8% by weight of the gum base, while the acetylated monoglyceride will be present in an amount of within the range of from about 0 to about 15% and preferably from about 1 to about 10% by weight of the gum base.

U.S. Pat. No. 4,352,823 also discloses that the soft core portion will also include a premixed recrystallized combination of at least two sweeteners, including solid and liquid sweeteners, which preferably include sucrose and/or sorbitol and/or hydrogenated starch hydrolysate, and high fructose syrup alone or together with liquid glucose, hydrogenated starch hydrolysate syrup, corn syrup, sorbitol syrup and/or invert sugar, in the recrystallized mixture, and flavors, softeners and other conventional chewing gum ingredients.

According to U.S. Pat. No. 4,352,823 it is essential that the liquid and solid sweeteners mentioned above comprise a preformed combination of particulate solid sweetener particles which are coated with a syrup sweetener and which mixture has been heated, dried to a homogeneous mass, and then cooled to recrystallize the mass into an amorphous solid. The recrystallized sweeteners impart a soft smooth consistency and texture to the chewing gum, similar to that found in nougat-type or fondant-type candies and non-stick properties as well.

The above premixed combination of sweeteners may comprise a so-called "dry fondant" mix formed of the above-mentioned sweeteners which is reconstituted with water and then added to the gum base and other chewing gum ingredients to form the soft chewing gum core portion of the coextruded chewing gum.

A preferred soft gum core portion is disclosed in the paragraph bridging columns 8 and 9 in U.S. Pat. No. 4,352,823, which composition includes 0 to 2 parts by weight glycerin.

It is further disclosed that in another preferred embodiment, the core portion contains pure fructose syrup as a replacement for corn syrup.

U.S. Pat. No. 4,452,820 issued to D'Amelia et al. on June 5, 1984 discloses a single phase formulation for a homogeneous gum base composition containing an elastomer and a resin in the absence of ester gums required to compatibilize the elastomer. The composition comprises a plasticized styrene-butadiene elastomer and a plasticized resin. The exemplified plasticizers for the resin include glyceryl triacetate and acetylated monoglyceride among others. It is disclosed that combinations of plasticizers may be used with a preferred combination being glyceryl triacetate and acetylated monoglyceride.

Thus, a variety of formulations have been used to provide gum compositions with desired physical characteristics. However, there is still a need for gum compositions having a substantially uniform soft chew texture from the beginning of the chew to the final chew. It would be highly desirable to provide such a gum composition without the need to modify the gum base or produce a new gum base. It would also be highly desirable to have such a soft chew gum composition, particularly a sugarless gum composition, which utilizes lower limits of glycerin, which in turn results in a composition resistant to staling. This invention provides such compositions.

SUMMARY OF THE INVENTION

This invention provides gum compositions, both chewing gum and bubble gum, both sugar and sugarless, which have a substantially uniform soft chew from the initial chew, through the intermediate chew and on through to the final chew. Surprisingly and unexpectedly, this has been accomplished by utilizing acetylated monoglycerides in the gum composition, as compared to using acetylated monoglycerides in the gum base. This is a significant distinction, as the addition of the acetylated monoglycerides to the gum base formulation does not provide the soft chew characteristics (soft chew from initial chew to final chew) obtained by the addition of the acetylated monoglycerides to the gum composition.

Another feature of this invention is the ability to use lower limits or levels of glycerin in sugarless gum compositions, than normally used, as a result of the addition of the acetylated monoglycerides to the gum composition. The use of lower levels of glycerin results in improved stability of the composition which is due to reduced moisture pick up from the environment which in turn is due to the reduction in the amount of glycerin (a humectant) used.

More specifically, this invention provides a gum composition comprising:
(A) an effective amount of a gum base;
(B) an effective amount of at least one sweetener;
(C) an acetylated monoglyceride in an amount of about 0.1 to about 0.8% by weight of said composition;
(D) glycerin in amounts of about 2 to about 15% by weight of said composition; and
(E) optionally, effective amounts of at least one additional conventional gum additive; wherein the total amount of all components of said composition equals 100%.

In another embodiment this invention provides an anhydrous sugarless gum composition comprising:
(A) an effective amount of a gum base;
(B) an effective amount of at least one sugar alcohol;
(C) an acetylated monoglyceride in an amount of at least about 0.1 to about 0.8% by weight of said composition;
(D) glycerin in an amount of about 2 to about 15% by weight of said composition; and
(E) optionally, effective amounts of at least one additional conventional gum additive; wherein the total amount of all components of said composition equals 100%.

The term "anhydrous" as used herein in reference to gum compositions means that the gum composition contains no more than 2% by weight of water in any form. Preferably, the anhydrous gum compositions contain no more than about 0.9% by weight of water and most preferably they contain no more than about 0.3% by weight of water based on the weight of the composition.

DETAILED DESCRIPTION OF THE INVENTION

The gum base used in this invention may be any water-insoluble gum base well known in the art, and includes those gum bases utilized for chewing gums and bubble gums. Illustrative examples of suitable polymers in gum bases include both natural and synthetic elastomers and rubbers. For example, those polymers which are suitable in gum bases include, without limitation, substances of vegetable origin such as chicle, crown gum, nispero, rosidinha, jelutong, perillo, niger gutta, tunu, balata, gutta-percha, lechi-capsi, sorva, gutta kay, mixtures thereof, and the like. Synthetic elastomers such as butadiene-styrene copolymers, polyisobutylenes, isobutylene-isoprene copolymers, polyethylenes, mixtures thereof, and the like are suitable.

The gum base may include a non-toxic vinyl polymer, such as polyvinyl acetate and its partial hydrolyzate, polyvinyl alcohol, and mixtures thereof. When utilized, the vinyl polymer may possess a molecular weight ranging from about 3,000 up to and including 94,000.

The gum base may contain conventional elastomer solvents. These solvents may comprise terpene resins, such as polymers of $\alpha$-pinene or $\beta$-pinene; methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood or gum rosin, pentaerythritol ester of wood or gum rosin, glycerol ester of partially dimerized wood or gum rosin, glycerol ester of polymerized wood or gum rosin, glycerol ester of tall oil rosin, glycerol ester of wood or gum rosin and partially hydrogenated wood or gum rosin, and partially hydrogenated methyl ester of wood or gum rosin and mixtures thereof. The elastomer solvent may be employed in an amount ranging from about 10% to about 75% and preferably about 45% to about 70% by weight of the gum base.

A variety of traditional ingredients used as plasticizers or softeners such as lanolin, palmitic acid. oleic acid, stearic acid. sodium stearate potassium stearate, glyceryl triacetate, glycerin, lecithin, glyceryl monostearate, propylene glycol monostearate, mixtures thereof, and the like, may also be incorporated into the gum base to obtain a variety of desirable textures and consistency properties. Waxes, for example, natural waxes, petroleum waxes such as polyurethene waxes, polyethylene waxes, paraffin waxes and microcrystalline waxes may also be incorporated into the gum base to obtain a variety of desirable textures and consistency properties. These traditional ingredients are generally employed in amounts of up to about 30% by weight and preferably in amounts of from about 3% to about 20% by weight of the gum base.

The gum base may include effective amounts of mineral adjuvants such as calcium carbonate, magnesium carbonate, alumina, aluminum hydroxide, aluminum silicate, talc, tricalcium phosphate, dicalcium phosphate and the like; as well as mixture thereof. These mineral adjuvants may serve as fillers and texturizing agents.

The gum base may also include effective amounts of conventional additives such as antioxidants, preservatives, colorants and the like. For example, titanium dioxide may be utilized as a colorant, and an antioxidant such as butylated hydroxytoluene, butylated hydroxyanisole, propyl gallate, and mixtures thereof, may also be included.

The amount of gum base employed will vary greatly depending on various factors such as the type of gum bases used, consistency desired and other components used to make the final product. In general, amounts of about 5% to about 60% by weight of the final gum composition (i.e., by weight of the total composition) are acceptable. Usually, however, amounts of about 15% to about 40% by weight are used with about 15% to about 35% being preferred and about 20% to about 30% being most preferred with about 24 to about 27% being more preferred.

The gum composition may include effective amounts of conventional additives selected from the group consisting of sweeteners, plasticizers, softeners, emulsifiers, waxes, fillers, bulking agents, mineral adjuvants, flavorings (flavoring agents), colorings (colorants or coloring agents), antioxidants, acidulents, thickeners, mixtures thereof, and the like. Some of these additives may serve more than one purpose. For example, in sugarless gum compositions the sweetener, e.g. sorbitol or other sugar alcohol or mixtures thereof, may also function as a bulking agent. Similarly, in sugar containing gum compositions the sweetener can also function as a bulking agent.

The plasticizers, softeners, mineral adjuvants, colorants, waxes, and antioxidants discussed above as being suitable for use in the gum base may also be used in the gum composition. Examples of other conventional additives which may be used include emulsifiers, such as lecithin and glyceryl monostearate; thickeners, used alone or in conjunction with other softeners, such as methyl cellulose, alginates, carrageenan, xanthan gum, gelatin, carob, tragacanth, locust bean, and carboxy methyl cellulose; acidulents such as malic acid, adipic acid, citric acid, tartaric acid, fumaric acid, and mixtures thereof; and fillers, such as those discussed above under the category of mineral adjuvants. The fillers may be used in amounts of about 4% to about 30% by weight of the gum composition.

Bulking agents suitable for use include sweetening agents selected from the group consisting of monosaccharides, disaccharides, polysaccharides, sugar alcohols, and mixtures thereof; polydextrose; maltodextrins; minerals such as calcium carbonate, talc, titanium dioxide, dicalcium phosphate, and the like; and the like. Bulking agents may be used in amounts up to about 90% by weight of the final gum composition with amounts of about 40 to about 70% by weight being more usual, with about 50 to about 65% by weight being preferred and about 55 to about 60% by weight being more preferred.

The sweetening agent (sweetener) used may be selected from a wide range of materials including water-soluble sweetening agents, water-soluble artificial sweeteners, water-soluble sweetening agents derived from naturally occurring water-soluble sweeteners, dipeptide based sweeteners, and protein based sweeteners, including mixtures thereof. Without being limited to particular sweeteners, representative illustrations encompass:

A. Water-soluble sweetening agents such as monosaccharides, disaccharides and polysaccharides such as xylose, ribose, glucose (dextrose), mannose, galactose, fructose (levulose), sucrose (sugar), maltose, invert sugar (a mixture of fructose and glucose derived from sucrose), partially hydrolyzed starch, corn syrup solids, dihydrochalcones, monellin, steviosides, glycyrrhizin, and sugar alcohols such as sorbitol, xylitol, mannitol, maltitol, hydrogenated starch hydrolysate and mixtures thereof;

B. Water-soluble artificial sweeteners such as the soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (acesulfame-K) the free acid form of saccharin, and the like;

C. Dipeptide based sweeteners, such as L-aspartic acid derived sweeteners, such as L-aspartyl-L-phenylalanine methyl ester (aspartame) and materials described in U.S. Pat. No. 3,492,131, L-$\alpha$-aspartyl-N-(2,2,4,4—tetramethyl-3-thietanyl)-D-alaninamide hydrate, methyl esters of L-aspartyl-L-phenylglycerine and L-aspartyl-L-2,5,dihydrophenylglycine, L-aspartyl-2,5-dihydro-L-phenylalanine; L-aspartyl-L-(1-cyclohexyen)-alanine; and the like;

D. Water-soluble sweeteners derived from naturally occurring water-soluble sweeteners, such as a chlorinated derivative of ordinary sugar (sucrose), known, for example, under the product designation of sucralose; and E. Protein based sweeteners such as thaumatoccous danielli (Thamatin I and II).

In general, an effective amount of sweetener is utilized to provide the level of bulk and/or sweetness desired, and this amount will vary with the sweetener selected. This amount will normally be 0.01% to about 90% by weight of the gum composition when using an easily extractable sweetener. The water-soluble sweeteners described in category A above, are usually used in amounts of about 25% to about 75% by weight, and preferably in amounts of about 50% to about 65% by weight of the final chewing gum composition. Some of the sweeteners in category A (e.g., glycyrrhizin) may be used in amounts set forth for categories B-E below due to the sweeteners known sweetening ability. In contrast, the sweeteners described in categories B-E are generally used in amounts of about 0.005% to about 5.0% by weight of the final chewing gum composition with about 0.05% to about 2.5% by weight being usual and about 0.05 to about 0.4% by weight being preferred with about 0.10 to about 0.35% by weight being more preferred. These amounts are ordinarily necessary to achieve a desired level of sweetness independent from the flavor level achieved from flavor oils.

Preferred sugar based sweeteners are sugar (sucrose), corn syrup and mixtures thereof. Preferred sugarless sweeteners are the sugar alcohols, artificial sweeteners, dipeptide base sweeteners and mixtures thereof. Preferably the sugar alcohols are used in the sugarless compositions because they can be used at levels which are sufficient to provide bulk as well as the desired level of sweetness. Preferred sugar alcohols are selected from the group consisting of sorbitol, xylitol, mannitol, and mixtures thereof. Most preferably sorbitol or a mixture of sorbitol and mannitol is utilized. The gamma form of sorbitol is preferred. Generally, the sugar alcohols will not exceed about 75% by weight of the composition and are usually present in amounts of about 40 to about 75% by weight of the composition. Preferably, when present, sorbitol does not exceed 70% by weight, mannitol does not exceed 15% by weight, and xylitol does not exceed 65% by weight of the composition. An artificial sweetener or dipeptide based sweetener is preferably added to the composition containing sugar alcohols in the amounts described above for their category of sweetener. Of the artificial sweeteners the saccharin salts are preferred, and of the dipeptide based sweeteners aspartame is preferred.

The flavorings (flavoring agents) that may be used include those known to the skilled artisan, such as, natural and artificial flavors. These flavorings may be chosen from synthetic flavor oils and flavoring aromatics, and/or oils, oleo resins and extracts derived from plants, leaves, flowers, fruits and so forth, and combination thereof. Representative flavor oils include, spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds and cassia oil. Also useful are artificial, natural or synthetic fruit flavors such as vanilla, and citrus oil, including lemon, orange, grape, lime and grapefruit and fruit essences including apple, pear, peach, strawberry, raspberry, cherry, plum, pineapple, apricot and so forth. These flavorings may be used individually or in admixture. Commonly used flavors include mints such as peppermint, menthol, artificial vanilla, cinnamon derivatives, and various fruit flavors, whether employed individually or in admixture.

Flavorings such as aldehydes and esters including cinnamyl acetate, cinnamaldehyde, citral diethylacetal, dihydrocarvyl acetate, eugenyl formate, p-methylamisol, and so forth may also be used. Generally any flavoring or food additive such as those described in *Chemicals Used in Food Processing*, pub 1274 by the National Academy of Sciences, pages 63–258 may be used.

Further examples of aldehyde flavorings include, but are not limited to acetaldehyde (apple); benzaldehyde (cherry, almond); anisic aldehyde (licorice, anise); cinnamic aldehyde (cinnamon); citral, i.e., alpha citral (lemon, lime); neral, i.e. beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese); valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., Melonal (melon); 2,6-dimethyloctanal (green fruit); and 2-dodecenal (citrus, mandarin); cherry; grape; strawberry shortcake; mixtures thereof; and the like.

The amount of flavoring employed is normally a matter of preference subject to such factors as flavor type, individual flavor, gum base and strength desired. Thus, the amount may be varied in order to obtain the result desired in the final product. Such variations are within the capabilities of those skilled in the art without the need for undue experimentation. In general, amounts of about 0.5% to about 3.0% by weight of the gum composition are useable with amounts of about 0.3% to about 1.5% being preferred and amounts of about 0.7% to about 1.2% being most preferred.

The coloring agents are used in amounts effective to produce the desired color. The coloring agents (colorants) useful in the present invention, include the pigments such as titanium dioxide, which may be incorporated in amounts of up to about 2% by weight of the gum composition, and preferably less than about 1% by weight. Colorants may also include natural food colors and dyes suitable for food, drug and cosmetic applications. These colorants are known as F.D. & C. dyes and lakes. The materials acceptable for the foregoing spectrum of use are preferably water-soluble, and include indigoid dye, known as F.D. & C. Blue No. 2, which is the disodium salt of 5,5-indigotindisulfonic acid. Similarly, the dye known as F.D. & C. Green No. 1 comprises a triphenylmethane dye and is the monosodium salt of 4-[4-N-ethyl-p-sulfobenzylamino)diphenylmethylene]-[1-N-ethyl-N-p-sulfoniumbenzyl)- $\Delta^{2,5}$ -cyclohexadienimine]. A full recitation of all F.D. & C. and D. & C. dyes and their corresponding chemical structures may be found in the Kirk-Othmer Encyclopedia of Chemical Technology, at Volume 5, Pages 857–884, which text is accordingly incorporated herein by reference.

In accordance with this invention glycerin may be used in amounts of about 2 to about 15% by weight of the composition. Usually, however, amounts of about 2 to about 13% by weight are used. The amount of glycerin used may be related to the type of gum composition formulated—i.e., sugar or sugarless and chewing gum versus bubble gum. A typical sugarless chewing gum composition of this invention can have less than or equal to 10% by wt. of the composition of glycerin with about 2 to about 9% being preferred, about 2 to about 8% being more preferred and about 2 to about 6% being most preferred. These lower amounts of glycerin are possible because of the discovered effects of the acetylate monoglycerides in the gum composition. Although it is possible to use the glycerin levels described above for chewing gum compositions in sugarless bubble gum compositions, it is more convenient to use about 3 to about 13% by weight in the sugarless bubble gum compositions. For sugar containing gums glycerin in amounts of about 2 to about 6% by weight of the composition is suitable with about 2 to about 5% by weight being preferred.

The acetylated monoglycerides are used in the gum composition in amounts effective to produce a substantially uniform soft chew throughout the entire chew—i.e., from initial chew to final chew. In general, conventional gums (i.e., gums not of this invention) have a hard initial chew which progresses to a soft intermediate chew which then progresses to a hard final chew. Gum compositions without acetylated monoglycerides in the gum composition, as compared to the gum base, do not exhibit the substantially uniform soft chew from initial chew to final chew that the compositions of this invention exhibit An additionally discovered benefit of using acetylated monoglycerides in the gum composition is the ability to use lower limits or levels of glycerin in sugarless gum compositions then normally used. The lower glycerin levels used in the present invention (i.e., about 10% or less, preferably about 9% or less) without the use of the acetylated monoglycerides, would not be sufficient to provide the soft chew characteristics obtained with the composition of this invention. The ability to use lower levels of glycerin in the present invention due to the use of the acetylated monoglycerides in the composition, as compared to the base, is also reflected in the stability of the composition of this invention. Since glycerin is a humectant as well as a softener, the less glycerin used translates into less moisture pick up from the environment which results in a more stable gum composition than one having higher amounts of glycerin.

The acetylated monoglycerides are generally used in an amount of about 0.1 to about 0.8% by weight of the composition with about 0.15 to about 0.6% by weight being preferred and about 0.1 to about 0.4% by weight being most preferred and about 0.2 to about 0.4% by weight being more preferred. A preferred acetylated monoglyceride has a saponification value above about 400 and preferably between about 430 and about 470. Additionally, the preferred acetylated monoglycerides has a percent acetylation above 90%, a hydroxyl value below 10 and a Reichert Meissl value above 150 (Food Chemical Codex (FCC) III/p508 and the revision by AOCS).

As stated previously the sugarless gum compositions of this invention are preferably anhydrous, and as such have a moisture content of not greater than 2% by weight of the composition. Anhydrous gum compositions are known in the art. Suitable gum compositions are described in U.S. Pat. No. 4,514,422 issued to Yang et al. on Apr. 30, 1985; Cherukuri at al. U.S. Pat. No. 4,579,738 issued on Apr. 1, 1986; Cherukuri et al. U.S. Pat. No. 4,581,234 issued on Apr. 8, 1986; and Cherukuri et al. U.S. Pat. No. 4,587,125 issued on May 6, 1986; the disclosures of each being incorporated herein by reference thereto.

The gum compositions of the present invention may be produced by methods known in the art. For example, a gum base is heated to a temperature sufficiently high enough to soften the base without adversely effecting the physical and chemical make up of the base. The optimum temperatures utilized may vary depending on the composition of the gum base used, but such temperatures are readily determined by those skilled in the art without undue experimentation.

Suitable temperatures are within the range of about 60° to about 90° C. A softener and the acetylated monoglycerides may then be added and mixed with the gum base to obtain a homogeneous pliable mixture. While mixing, the bulking agent and/or sweeteners are added incrementally to the homogeneous pliable mixture until a homogeneous mass is obtained. Then materials such as a flavoring agent as well as other traditional additives may be added incrementally and mixed until a homogeneous mass is obtained. Thereafter, the mixture is formed into suitable gum shapes. The gums of the invention may be in any form known in the art, such as stick gum, slab gum chunk gum, shredded gum, hard coated gum, tabletted gum, as well as center-filled gum.

In processes for producing the anhydrous sugarless gum compositions of this invention it is preferred that substantially anhydrous starting materials be used. In such a process the glycerin should be provided in anhydrous form and the sugar alcohols and gum base can be dried by heating under vacuum. The gum base, which is conventionally previously melted at temperatures that may range from about 90° C. to 100° C. can be heated at a temperature ranging from about 80° to about 90° C. at a vacuum less than about 400 mm Hg, for a period of time sufficient to render the base substantially anhydrous. For example, the gum base may be heated under these conditions for a period of about thirty minutes just prior to mixing with the remaining ingredients of the gum composition. The acetylated monoglycerides and any softeners may then be added and blended with the gum base to form a gum composition.

The glycerin, as noted earlier, should be provided in anhydrous form. Both the glycerin and the sugar alcohol component may be dried in similar fashion to the gum base, by heating, for example, at a temperature ranging from about 60° C. to about 70° C. under a vacuum less than about 40 mm Hg. to remove any trace amounts of water. If pre-drying is practiced, it should be conducted overnight, and just prior to the formulation of the present gum composition. Pre-drying is not necessary, however, if the materials are provided initially in dry form as defined herein.

After the foregoing materials are treated as described above, the sugar alcohols, in the event that a mixture is utilized, are heated to a temperature of about 50° C. while undergoing agitation or mixing, for a period of time such as three minutes. For example, sorbitol and mannitol may be combined and blended in this fashion.

The glycerin is then added to the above mixture, and mixing is continued at the same temperature for a period of time sufficient to form a uniform mixture of the ingredients, and preferably for about eight minutes. Thereafter, the gum base, previously melted as indicated, and maintained under vacuum just prior thereto, may be added to the resulting mixture, and mixing may thereafter continue for a further period sufficient to form a homogeneous mixture of all ingredients added thus far. Thus, for example, mixing may be continued for a period of time of about ten minutes. Finally, heating is discontinued, and the remainder of the ingredients to be added to the composition, including the flavoring, colorant if any, and other adjuvants, are added, and the resulting composition is then mixed for a period of time, that may range as high as thirty minutes, to form a fully uniform composition. The mass is then removed from the mixer and is allowed to cool further, and may thereafter be formed into various final shapes by known gum manufacturing techniques. For example, the mass may be rolled in contact with a conventional dusting medium, such as calcium carbonate, mannitol, talc and others.

Another process, in brief, for producing anhydrous gum compositions comprises softening the base between a temperature range of about 40° C. to about 60° C.; admixing the acetylated monoglycerides, softening agents, sweetening agents and flavoring agents; extruding the composition prior to cooling; forming the composition into suitable chewing gum pieces without cooling; and immediately wrapping the pieces with a minimum of protective wrapping without prior conditioning. No moisture or moisture-containing ingredients are used in the process or added to the ingredients and the chewing gum composition has a final moisture content of up to about 0.9% by weight. This process is described in U.S. 4,579,738, U.S. Pat. No. 4,581,234, and Cherukuri et al. U.S. Pat. No. 4,587,125 to Those skilled in the art will appreciate that the total amount of all ingredients (components) used in the chewing gum compositions of this invention equals 100% by weight of the total composition. Also, unless stated otherwise, all percents herein are percent by weight of the total composition.

The following examples are illustrative only and should not be construed as limiting the invention in any way. Those skilled in the art will appreciate that variations are possible which are within the spirit and scope of the appended claims.

In the examples that follow a commercially available acetylated monoglyceride was used having a saponification value greater than 400.

EXAMPLE I

A chewing gum composition of this invention was prepared having the formulation set forth in Table I.

TABLE I

| Ingredient | % by wt. of Composition |
| --- | --- |
| Gum base | 26.000 |
| Acetylated monoglyceride | 0.150 |
| Bulking Agents* | 61.092 |
| Flavor blend | 1.800 |
| Glycerin USP special | 9.000 |
| Aspartame | 0.384 |
| Softeners | 1.574 |

*A combination of sorbitol and mannitol.

The chewing gum composition was produced by adding the gum base, a softener and the acetylated monoglyceride to a gum kettle and mixing for about 2 minutes reversed. Then about ⅔ of the sorbitol and all of the mannitol were added to the blend in the gum kettle and mixed for about one minute forward. Following this step the glycerin was added to the blend and mixed forward for about 3 minutes, reversed for about ½ minute and then forward for about ½ minute. The remaining sorbitol was then added and forward mixing was started and the flavor was added. Forward mixing of this blend was done for about 4 minutes. Finally, the aspartame and remaining softeners were added to the blend and the resulting composition was mixed 3 minutes forward. The gum composition was then shaped into individual pieces using standard equipment.

The chewing gum composition had a soft initial chew, a soft intermediate chew, and a soft final chew—i.e., the chewing gum composition had a substantially uniform soft chew from the start of the chew through to the final chew. The composition was also resistant to staling and did not become "sticky and fluid."

EXAMPLE 2

A chewing gum composition of this invention was prepared having the formulation set forth in Table II. The procedure followed in preparing the composition was similar to the procedure of Example 1.

TABLE II

| Ingredient | % by wt. of Composition |
| --- | --- |
| Gum base | 28.000 |
| Acetylated monoglyceride | 0.150 |
| Bulking Agents* | 58.788 |
| Color | 0.100 |
| Flavor blend | 2.100 |
| Aspartame | 0.385 |
| Softeners | 1.477 |
| Glycerin | 9.000 |

*A combination of sorbitol and mannitol.

The chewing gum composition had a soft initial, intermediate and final chew. The composition was resistant to staling and did not become "sticky and fluid."

EXAMPLE 3

A composition similar to that of Example 1, but not of this invention was prepared, for comparative purposes, having the formulation set forth in Table III.

TABLE III

| Ingredient | % by wt. of Composition |
|---|---|
| Gum base | 26.00 |
| Bulking Agents* | 54.8 |
| Flavor | 2.29 |
| Aspartame | 0.279 |
| Softeners | 1.631 |
| Glycerin | 15.00 |

*A combination of sorbitol and mannitol.

The comparative composition had a relatively high amount of glycerin and did not contain acetylated monoglyceride in the gum composition. The composition became sticky and fluid, possibly due to the high glycerin content, and was therefore much less stable than the inventive gum composition.

EXAMPLE 4

A sugarless chunk bubble gum composition of this invention was prepared from the formulation given in Table IV.

TABLE IV

| Ingredient | % by wt. of Composition |
|---|---|
| Gum base | 23.0000 |
| Acetylated monoglyceride | 0.3000 |
| Bulking Agents* | 57.891 |
| Acidulents | 1.35 |
| Color | 0.4000 |
| Glycerin USP special | 13.0000 |
| Flavor blend | 1.0000 |
| Aspartame | 0.1699 |
| Softeners | 2.8891 |

*Combination of sorbitol and mannitol.

A first batch having the formulation set forth in Table IV was prepared by adding a molten premix of the gum base, mineral adjuvant, the acetylated monoglyceride and a softener to a gum kettle and mixing in reverse for two minutes. To this there was added the bulking agents, the acidulents, and a preblend of the color and a softener which was mixed in forward for one minute. The glycerin was then added and mixed in forward for 3 minutes and reverse for ½ minute. Then the flavor was added while the mixer was running and was mixed forward for 1½ minutes. Finally, the aspartame and the remainder of the softeners were added and mixed for 3 minutes. The drop temperature was about 39° C.–43° C.

A second batch was made as was the first batch except a different color was used. The two batches were coextruded so that ½ of the chunk obtained is comprised of each (first and second) batch. The bubble gum composition had a soft chew from the initial chew on through to the final chew.

EXAMPLE 5

A sugarless chunk bubble gum composition of this invention was prepared from the formulation set forth in Table V.

TABLE V

| Ingredient | % by wt. of Composition |
|---|---|
| Gum base | 25.0000 |
| Acetylated monoglyceride | 0.3000 |
| Bulking Agents* | 57.3210 |
| Acidulents | 1.2000 |
| Color | 0.0900 |
| Glycerin USP special | 12.0000 |
| Flavor | 0.9300 |
| Aspartame | 0.1699 |
| Softeners | 2.9891 |

*Combination of sorbitol and mannitol.

The composition was prepared as a coextruded gum of two batches or layers by a procedure similar to that of Example 4 except that in the first batch the color was not preblended with a softener, instead a softener was added with the glycerin. The second batch contained no color and 57.4110% by wt. bulking agents was used instead of the 57.3210% by wt. used in the first batch.

The two batches formed from the formulation in Table V were coextruded to form a chunk bubble gum. The bubble gum had a soft chew from the initial chew to the final chew.

EXAMPLE 6

A sugarless chunk bubble gum composition of this invention was prepared from the formulation in Table VI.

TABLE VI

| Ingredient | % by wt. of Composition |
|---|---|
| Gum base | 25.0000 |
| Acetylated monoglyceride | 0.6000 |
| Bulking Agents* | 56.4510 |
| Acidulents | 0.5000 |
| Color | 0.1400 |
| Glycerin USP special | 12.0000 |
| Flavor | 1.2000 |
| Aspartame | 0.250 |
| Softeners | 3.859 |

*Combination of sorbitol and mannitol.

The bubble gum composition was coextruded from two batches and was prepared by a procedure similar to that of Example 4. In the second batch the amount of color was reduced by 0.12% by wt. and the amount of one of the bulking agents was increased by this amount. Also in the batches the color was added with the bulking agents and acidulent. The glycerin was then added and mixed in forward for 3 minutes and reverse for ½ minute. Then the flavor was added while the mixer was running and was mixed forward for 1½ minutes. Finally, the aspartame and the remainder of the softeners were added and mixed for 3 minutes. The drop temperature was about 39° C.–43° C.

The chunk bubble gum composition produced has a soft chew throughout the chew—i.e., a soft chew from initial to final chew.

EXAMPLE 7

A sugar containing bubble gum composition of this invention was prepared by conventional techniques as was a comparative composition. The formulation of the inventive composition, Composition A, and the formulation of the comparative composition, Composition B, is set forth in Table VII.

TABLE VII

| Ingredient | % by wt. of Composition | |
|---|---|---|
| | Inventive A | Comparative B |
| Gum base | 19.50 | 19.50 |
| Sweeteners* | 75.35 | 75.55 |
| Glycerin | 3.00 | 3.00 |
| Softener | 0.25 | 0.25 |
| Flavor | 0.80 | 0.80 |
| Acidulent | 0.75 | 0.75 |
| Color | 0.15 | 0.15 |
| Acetylated monoglyceride | 0.20 | — |

*Combination of sugar and corn syrup.

The Inventive Composition A containing acetylated monoglyceride had a more uniform soft chew from initial chew to final chew than the Comparative Composition B which did not contain acetylated monoglyceride.

EXAMPLE 8

Following the procedure of Example 1 two sugarless inventive compositions, A and B, were prepared as well as sugarless Comparative Composition C. The compositions were stored for 5 weeks at about 80° F. and about 80% relative humidity (RH) to determine their moisture pick up. The formulations and results are given in Table VIII.

TABLE VIII

| Ingredients | % by wt. of Composition | | |
|---|---|---|---|
| | Inventive A | Inventive B | Comparative C |
| Gum base | 26.0 | 27.0 | 23.0 |
| Glycerin | 9.0 | 9.0 | 15.0 |
| Softeners | 2.8 | 2.8 | 2.8 |
| Flavor | 1.6 | 1.6 | 1.6 |
| Bulking agents* | 60.1 | 59.1 | 57.4 |
| Sodium saccharin | 0.2 | 0.2 | 0.2 |
| Acetylated monoglyceride | 0.3 | 0.3 | — |
| Results | | | |
| % moisture pick up | 25 | 26 | 30 |

*Combination of sorbitol, mannitol and flavor carrier

The data in Table VIII demonstrate that the higher amounts of glycerin used in Comparative C resulted in significantly more moisture pick up than Inventive A and B which used less glycerin. The higher amount of glycerin in Comparative C was necessary in order to attempt to get the same softness of chew characteristics that were obtainable with the lower amounts of glycerin in combination with the use of acetylated monoglyceride in Inventive A and B.

The invention thus being described, it will be obvious that the same may be varied in many ways. Such variations are not to be regarded as a departure from the spirit and scope of the invention and all such modifications are intended to be included within the scope of the claims.

What is claimed is:

1. A gum composition having a substantially uniform soft chew over time comprising:
   (a) an effective amount of a gum base;
   (b) an effective amount of at least one sweetener;
   (c) an acetylated monoglyceride in an amount of about 0.1 to about 0.8% by weight of said composition and incorporated in that part of the gum composition other than the gum base;
   (d) glycerin in amounts of about 2 to about 15% by weight of said composition; and wherein the total amount of all components of said composition equals 100%.

2. The gum composition of claim 1 wherein said base is present in amounts of about 15 to about 35% by weight of said composition.

3. The gum composition of claim 1 wherein the said sweetener is selected from the group consisting of water-soluble sweetening agents, water-soluble artificial sweetening agents, dipeptide based sweetening agents, water-soluble sweetening agents derived from naturally occurring water-soluble sweetening agents, protein based sweeteners, and mixtures thereof.

4. The gum composition of claim 3 wherein said sweetener is selected from the group consisting of xylose, ribose, glucose, mannose, galactose, fructose, sucrose, maltose, invert sugar, partially hydrolyzed starch, corn syrup solids, dihydrochalcones, monellin, steviosides, glycyrrizin, sorbitol, xylitol, mannitol, maltitol, hydrogenated starch hydrolysate, saccharin acid, saccharin salts, cyclamate salts, acesulfame-K, L-aspartyl-L-phenylalanine methyl ester, L-α-aspartyl-N-(2,2,4,4-tetramethyl-3-thietanyl)-D-alaninamide hydrate, a chlorinated derivative of sucrose, thaumatin, and mixtures thereof 5. The gum composition of claim 1 wherein there is further included at least one gum additive selected from the group consisting of: plasticizers, softeners, emulsifiers, waxes, fillers, bulking agents, mineral adjuvants, flavorings, colorants, antioxidants, preservatives, and mixtures thereof.

6. The gum composition of claim 1 wherein there is further included a flavoring agent selected from the group consisting of synthetic flavor oils; flavoring aromatics; oleo resins; extracts derived from plants, leaves, flowers, and fruits; fruit essences; and mixtures thereof.

7. The gum composition of claim 1 wherein said sweetener is selected from the group consisting of monoglycerides, disaccharides, polysaccharides, and mixtures thereof.

8. The gum composition of claim 1 wherein said sweetener is selected from the group consisting of sugar alcohols, artificial sweeteners, dipeptide based sweeteners and mixtures thereof.

9. The gum composition of claim 8 wherein said sweeteners is present in an amount of about 40 to about 70% by weight of said composition and said sweetener is selected from the group consisting of sorbitol, xylitol, mannitol, and mixtures thereof.

10. The gum composition of claim 8 wherein said sweetener is sorbitol.

11. The gum composition of claim 8 wherein said sweetener is a mixture of sorbitol and mannitol.

12. The gum composition of claim 9 wherein there is further included a sweetener selected from the group consisting of artificial sweeteners, dipeptide based sweeteners, and mixtures thereof and said sweetener is present in an amount of about 0.05 to about 2.5% by weight of said composition.

13. The gum composition of claim 12 wherein said sweetener is aspartame

14. The gum composition of claim 11 wherein there is further included a sweetener selected from the group consisting of artificial sweeteners, dipeptide based sweeteners, and mixtures thereof and said sweetener is present in an amount of about 0.05 to about 2.5% by weight of said composition.

15. The gum composition of claim 14 wherein said sweetener is aspartame.

16. An anhydrous sugarless gum composition having a substantially uniform soft chew over time comprising:
  (a) a gum base in amounts of about 15 to about 35% by weight of said composition;
  (b) at least one sugar alcohol in an amount of not more than about 70% by weight of said composition;
  (c) an acetylated monoglyceride in an amount of about 0.1 to about 0.8% by weight of said composition and incorporated in that part of the gum composition other than the gum base;
  (d) glycerin in amounts of about 2 to about 15% by weight of said composition; and
wherein the total amount of all components of said composition equals 100%.

17. The gum composition of claim 16 wherein said sugar alcohol is present in amounts of about 40 to about 70% by weight of said composition.

18. The gum composition of claim 16 wherein said sugar alcohol is selected from the group consisting of sorbitol, xylitol, mannitol, and mixtures thereof.

19. The gum composition of claim 18 wherein said sugar alcohol is sorbitol.

20. The gum composition of claim 18 wherein said sugar alcohol is a mixture of sorbitol and mannitol 21. The gum composition of claim 16 wherein there is further included at least one additional conventional gum additive selected from the group consisting of sugarless sweeteners, plasticizers, softeners, emulsifiers, waxes, fillers, bulking agents, mineral adjuvants, flavorings, colorants, antioxidants, preservatives, and mixtures thereof.

22. The gum composition of claim 21 wherein there is further included a sugarless sweetener selected from the group consisting of artificial sweeteners, dipeptide based sweeteners and mixtures thereof 23. The gum composition of claim 22 wherein the sugar alcohol is selected from the group consisting of sorbitol, xylitol, mannitol, and mixtures thereof.

24. The gum composition of claim 23 wherein the sugarless sweetener is selected from the group consisting of: the free acid form of saccharin, the soluble saccharin salts, the cyclamate salts, acesulfame-K, aspartame, and mixtures thereof.

25. The gum composition of claim 12 wherein said sweetener is a saccharin salt.

26. The gum composition of claim 25 wherein said sweetener is sodium saccharin.

27. The gum composition of claim 1 wherein the acetylated monoglyceride has a saponification value above about 400.

28. The gum composition of claim 1 wherein the acetylated monoglyceride has a percent acetylation above 90%.

29. A gum composition as recited in claim 1 wherein said acetylated monoglyceride has a saponification value above about 400, a percent acetylation above 90%, a hydroxyl value below 10, and a Reichert Meissl value above 150.

30. A gum composition as recited in claim 28 wherein said glycerin is present in an amount from 2 to 6 weight percent of the gum composition.

* * * * *